US 6,633,975 B1

(12) United States Patent
Sawada et al.

(10) Patent No.: US 6,633,975 B1
(45) Date of Patent: Oct. 14, 2003

(54) DATA PROCESSING SYSTEM HAVING PLURALITY OF PROCESSORS AND EXECUTING SERIES OF PROCESSINGS IN PRESCRIBED ORDER

(75) Inventors: Kenichi Sawada, Toyohashi (JP); Atsushi Ishikawa, Okazaki (JP); Mitsuru Obara, Toyohashi (JP); Toshiya Shirasawa, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/437,406

(22) Filed: Nov. 10, 1999

(30) Foreign Application Priority Data

Nov. 13, 1998  (JP) ............................................. 10-323485

(51) Int. Cl.[7] ..................... G06F 15/177; G06F 15/163; G06F 9/52
(52) U.S. Cl. .............................. 713/1; 712/35; 712/245; 709/106; 709/107
(58) Field of Search ................................. 711/147, 150, 711/158, 152, 153; 712/11, 34, 35, 245; 713/1; 358/468; 709/107, 106

(56) References Cited

U.S. PATENT DOCUMENTS

| | | | | |
|---|---|---|---|---|
| 4,497,023 A | * | 1/1985 | Moorer ........................ 712/205 |
| 5,390,171 A | * | 2/1995 | Storm ......................... 370/360 |
| 5,467,459 A | * | 11/1995 | Alexander et al. ........... 711/153 |
| 5,481,727 A | * | 1/1996 | Asano et al. ................ 711/150 |
| 5,630,135 A | * | 5/1997 | Orimo et al. ................ 709/106 |
| 5,701,505 A | * | 12/1997 | Yamashita et al. ............. 712/11 |
| 5,715,070 A | * | 2/1998 | Tone et al. .................. 358/468 |
| 5,894,312 A | * | 4/1999 | Ishiwata et al. ............. 345/504 |
| 6,052,763 A | * | 4/2000 | Maruyama .................... 711/152 |
| 6,145,065 A | * | 11/2000 | Takahashi et al. ........... 711/158 |

FOREIGN PATENT DOCUMENTS

| | | | |
|---|---|---|---|
| EP | 0 743 617 | | 11/1996 |
| JP | 61-028164 | | 2/1986 |
| JP | 06-125411 | | 5/1994 |
| JP | 408287022 A | * | 11/1996 |
| JP | 09-114969 | | 5/1997 |

OTHER PUBLICATIONS

Andrew S. Tanenbaum, Distributed Operating Systems, 1995, Prentice–Hall, Inc., pp. 449–452.*

* cited by examiner

Primary Examiner—Thomas Lee
Assistant Examiner—Chun Cao
(74) Attorney, Agent, or Firm—Burns, Doane, Swecker & Mathis, LLP (57) ABSTRACT

A data processing system has the following construction in order to achieve high speed data processing with reduced memory capacity. There are provided a memory to store a plurality of pieces of sequentially input data to be processed, a plurality of processors to execute a series of processings, e.g., Log conversion, MTF correction, gamma correction and binarization in this order to the data to be processed stored in the memory in the order of input, and a state control portion to determine which processing is stagnant by monitoring the progress of a processing by each of said plurality of processors and prohibit a processor executing a processing succeeding to a processing determined as being stagnant from accessing the memory. Processings by the plurality of processors are executed asynchronously and the plurality of processors share the memory.

16 Claims, 11 Drawing Sheets

| ADDRESS DIFFERENCE | REGISTER SET VALUE |
|---|---|
| dif_1 | reg_1 |
| dif_2 | reg_2 |
| dif_3 | reg_3 |

FIG. 7A

PIXEL AFTER Log CONVERSION

PIXEL AFTER MTF CORRECTION

FIG. 7B

— PIXEL FOR MTF CORRECTION

3×3 MATRIX

DATA PROCESSING SYSTEM HAVING PLURALITY OF PROCESSORS AND EXECUTING SERIES OF PROCESSINGS IN PRESCRIBED ORDER

This application is based on application No. 10-323485 filed in Japan, the content of which is hereby incorporated by reference.

BACKGROUND OF THE INVENTION

1. Field of the Invention

The present invention relates generally to a data processing system, and more particularly, to a data processing system executing a plurality of processings in a prescribed order using a plurality of processors.

2. Description of the Related Art

Figure 11:
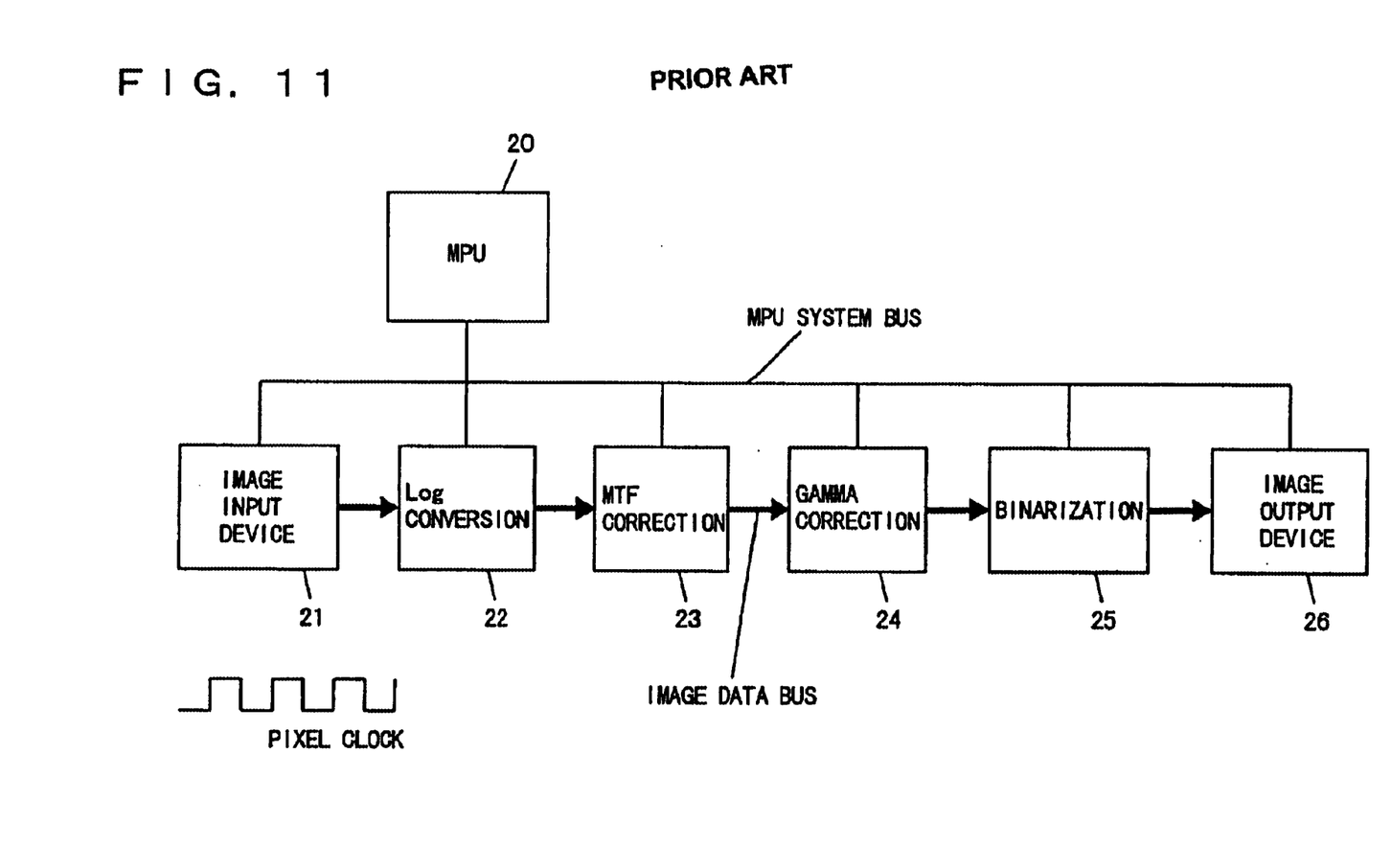
FIG. 11 is a block diagram showing the general configuration of a conventional data processing apparatus.

FIG. 11 is a block diagram showing the general configuration of a conventional data processing apparatus. The conventional data processing apparatus includes an MPU 20, an image input device 21, processing portions 22 to 25 to execute four processings, Log conversion, MTF correction, gamma correction and binarization, and an image output device 26.

Image input device 21 includes a photoelectric conversion element such as CCD, a driving system therefor, and an A/D converter, scans a document including both a continuous tone image and line drawing to generate a sampled analog signal, and quantizes the sampled analog signal using the A/D converter into data representing continuous tone reflectivity, in which each pixel has 8 bits (256 tones), for output as a digital signal.

Processing portion 22 performs Log conversion processing and calculates and outputs 8-bit continuous tone density data in the Log relation with the continuous tone reflectivity data output from image input device 21.

Processing portion 23 performs MTF correction processing. The MTF correction processing is performed to correct sharpness, and the sharpness of the 8-bit continuous tone density data obtained by the Log conversion at processing portion 22 is corrected using a digital filter such as Laplacian filter.

Processing portion 24 performs gamma correction processing. The gamma correction processing is performed to correct the difference in the tone curve between image input device 21 and image output device 26 so as to realize a desired gamma characteristic for the entire data processing apparatus. For example, using an LUT (Look Up Table) of 256 words, 8 bits, non-linear gamma correction data is output. The gamma correction processing may be also performed to set a desired gamma characteristic for the operator.

Processing portion 25 performs binarizing processing. The binarizing processing is performed to convert 8-bit continuous tone density data subjected to the gamma correction into 1-bit binary data corresponding to the brightness. The binarizing processing employs area-type tone binarizing such as error diffusion binarizing.

Image output device 26 is a printer such as an electrophotographic printer or ink jet printer, and prints the 1-bit binary data formed by binarization at processing portion 25 onto an output medium such as paper.

Image input device 21, processing portions 22 to 25 and image output device 26 are connected through an image data bus, and process data input in synchronization with a pixel clock common to them.

Thus, in the conventional data processing apparatus, image data input from image input device 21 is sequentially processed by processing portions 22 to 25 on a pixel data piece basis. In order to achieve synchronism in exchange of the pixel data among image input device 21, processing portions 22 to 25, and image output device 26, a pixel clock corresponding to each piece of pixel data is generated by a clock generator (not shown), and image input device 21, processing portions 22 to 25, and image output device 26 operate in synchronization with the pixel clock.

However, since the conventional data processing apparatus allows image input device 21, processing portions 22 to 25, and image output device 26 to operate in synchronization with a pixel clock, and the pixel clock must be generated based on any element having the lowest operating speed among image input device 21, processing portions 22 to 25, and image output device 26. As a result, the circuit must be constructed according to a processing portion forming a bottleneck, which makes difficult the circuit design.

Figure 12:
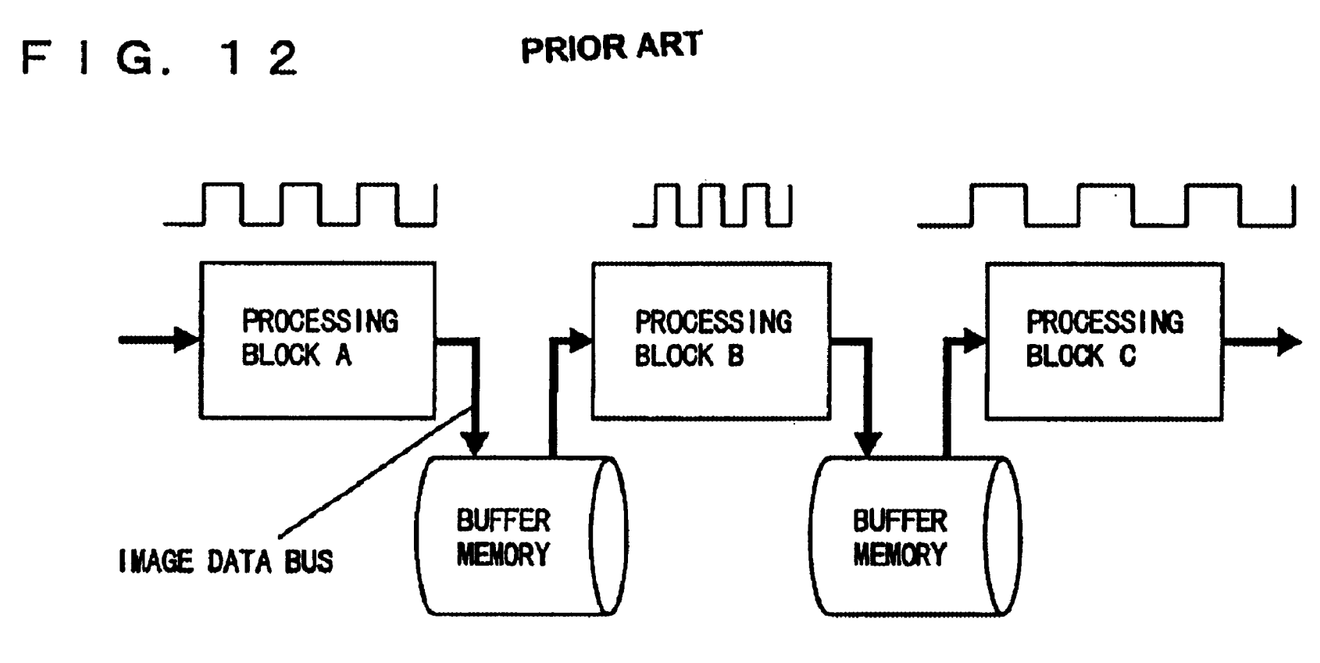
FIG. 12 is a block diagram showing asynchronous processings executed by a plurality of processing blocks.

In order to solve this problem, a circuit configuration in which image input device 21, processing portions 22 to 25 and image output device 26 are connected in an asynchronous manner so as to be operated in response to independent clocks may be considered. FIG. 12 is a block diagram for explaining a circuit configuration in which processing blocks are connected in an asynchronous manner. Referring to FIG. 12, processing blocks A, B and C can operate to perform processings in response to clock signals specific to them.

In this case, however, data cannot be directly exchanged among the processing blocks, and therefore buffer memories having a prescribed capacity should be provided among the blocks. Such a buffer memory can absorb the difference in the processing speeds of the processing blocks. Thus, if the processing blocks are connected in an asynchronous manner, a processing portion forming a bottleneck would not determine the processing speed of the data processing apparatus unlike the case of connecting image output device 21, processing portions 22 to 25 and image output device 26 as shown in FIG. 11 to operate in synchronization with one another. Meanwhile, the buffer memories are necessary, which pushes up the cost. In addition, since data is written/read to/from the buffer memory by two processing blocks, each block must accommodate such that one of the blocks can access a buffer memory, or such an arbitration processing must be performed by a controller provided for each of the buffer memories.

SUMMARY OF THE INVENTION

The present invention was made in view of the above, and it is one object of the present invention to provide a data processing system capable of processing data at a high speed. Another object of the present invention is to provide a data processing system which permits the memory capacity used to be reduced.

In order to achieve the above-described objects, a data processing system according to one aspect of the present invention includes a memory which stores a plurality of pieces of sequentially input data to be processed, a plurality of processors which execute a series of processings in a prescribed order to the data to be processed stored in the memory in the order of input, and a first controller which determines which processing is stagnant by monitoring the progress of a processing by each of said plurality of processors and prohibits a processor executing a processing succeeding to a processing determined as being stagnant from accessing the memory, and processings executed by the plurality of processors are executed asynchronously, and the plurality of processors share the memory.

More preferably, the system further includes a second controller to permit a processor executing a more preceding processing to access the memory if there are access requests from a plurality of processors to the memory at the same time.

According to the present invention, a data processing system capable of processing data at a high speed can be provided. Furthermore, a data processing system which permits data to be processed with a reduced memory capacity can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be now described in conjunction with the accompanying drawings, in which the same reference characters refer to the same or corresponding portions.

Figure 1:
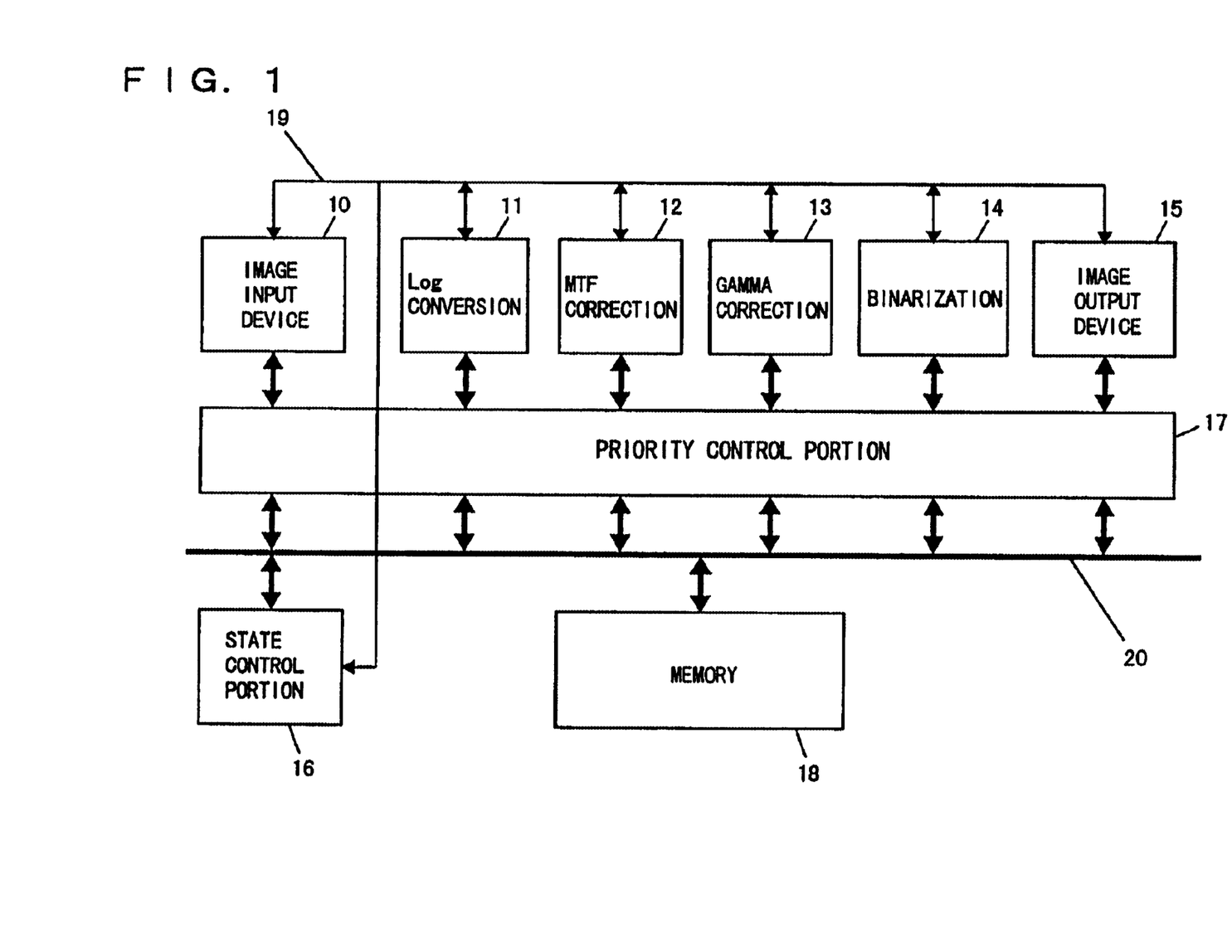
FIG. 1 is a block diagram showing the general configuration of a data processing apparatus according to one embodiment of the present invention.

Referring to FIG. 1, a data processing apparatus according to one embodiment of the present invention includes an image input device 10, processing portions 11 to 14 to execute various processings to input image data on a pixel data piece basis, an image output device 15 to output processed image data on a recording medium such as paper, a state control portion 16 to monitor the operating states of image input device 10, processing portions 11 to 14 and image output device 15 (hereinafter referred to as "processing portions 10 to 15") and control the operations of the processing portions, a memory 18, and a priority control portion 17 to control the accessing of processing portions 10 to 15 to memory 18.

Processing portion 11 performs Log conversion to the image data input by image input device 10 on a pixel data piece basis. Processing portion 12 performs MTF correction to data after the Log conversion at processing portion 11. Processing portion 13 performs gamma correction to the data after the MTF correction at processing portion 12. Processing portion 14 binarizes the data after the gamma correction at processing portion 13. The four processings, the Log conversion, MTF correction, gamma correction and binarization are the same as the processings described in conjunction with the above conventional technique and the description is not repeated here. Image input device 10 and image output device 15 are the same as image input device 21 and image output device 26 previously described, and therefore the description is not repeated here.

Processing portions 10 to 15 are connected to memory 18 through priority control portion 17 and a system bus 20, and can write/read data to/from memory 18.

Memory 18 is a common memory to/from which data can be written/read by processing portions 10 to 15. Only one of processing portions 10 to 15 can read/write data from/to memory 18. In other words, two processing portions can not access to memory 18 at a time.

Image data input from image input device 10 is subjected to processings by processing portions 11 to 14 on a pixel data piece basis, and the processed data is displayed or output onto a recording medium by image output device 15. Processing portions 10 to 15 can process data asynchronously and independently from each other without achieving synchronism with other processing portions 10 to 15.

Image data input from image input device 10 is subjected to the four processings, i.e., Log conversion, MTF correction, gamma correction and binarization in this order on a pixel data piece basis at processing portions 11 to 14, and is then output from image output device 15. As a result, the order of processings performed to the pixel data is prescribed, and a succeeding processing will not be performed ahead of a preceding processing in the order. For example, Log conversion is followed by MTF correction, and gamma correction will not be executed after Log conversion.

Figure 2A:
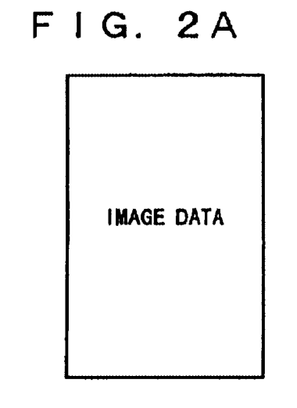
FIG. 2A to 2F are diagrams for use in illustration of change with time in data stored in a memory.
Figure 2B:
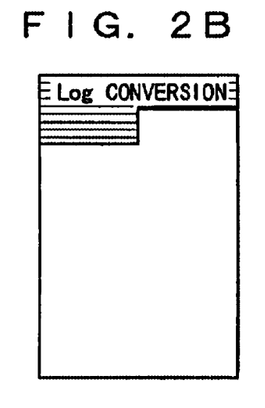
Figure 2C:
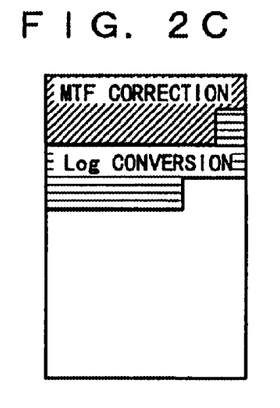
Figure 2D:
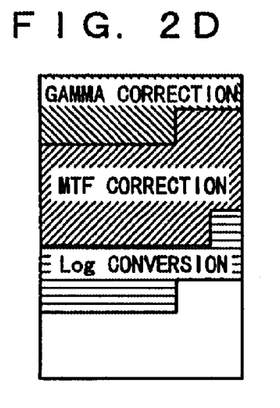
Figure 2E:
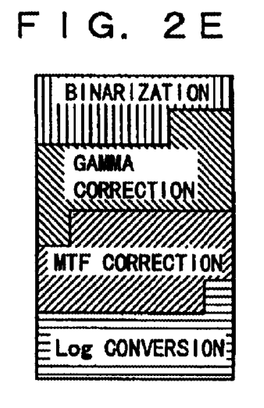
Figure 2F:
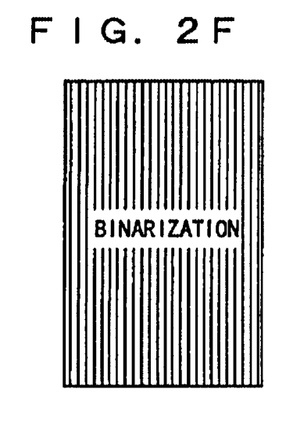

FIGS. 2A to 2F are diagrams for use in illustration of states of image data stored in memory 18. FIG. 2A shows the state of image data input by image input device 10 and stored in memory 18. FIG. 2B shows the state in which a part of the image data stored in memory 18 has been subjected to Log conversion at processing portion 11. FIG. 2C shows the state in which a part of the image data stored in memory 18 has been subjected to MTF correction at processing portion 12. FIG. 2D shows the state in which a part of the image data stored in memory 18 has been subjected to gamma correction at processing portion 13. FIG. 2E shows the state in which a part of the image data stored in memory 18 has been subjected to binarization at processing portion 14. FIG. 2F shows the state in which all the pixel data pieces of the image data stored in memory 18 have been binarized.

Thus, image data stored in memory 18 is subjected to the four processings, i.e., Log conversion, MTF correction, gamma correction and binarization on a pixel data piece basis, and state control portion 16 stores information on to which processing each pixel data has been through. As a result, state control portion 16 monitors up to which pixel data each of processings at processing portions 11 to 14 has been performed.

Note that in image data stored in memory 18, the state flag representing up to which processing pixel data has been through may be stored together with the pixel data, so that state control portion 16 may monitor the progress of processings by processing portions 11 to 14 by referring to the state flag stored in memory 18.

The flow of processings at processing portions 11 to 14 will be now described. Processings by processing portions 11 to 14 are different in the contents of Log conversion, MTF correction, gamma correction and binarization, and the other points are the same. Therefore, the flow of the Log conversion will be described herein by way of illustration.

Figure 3:
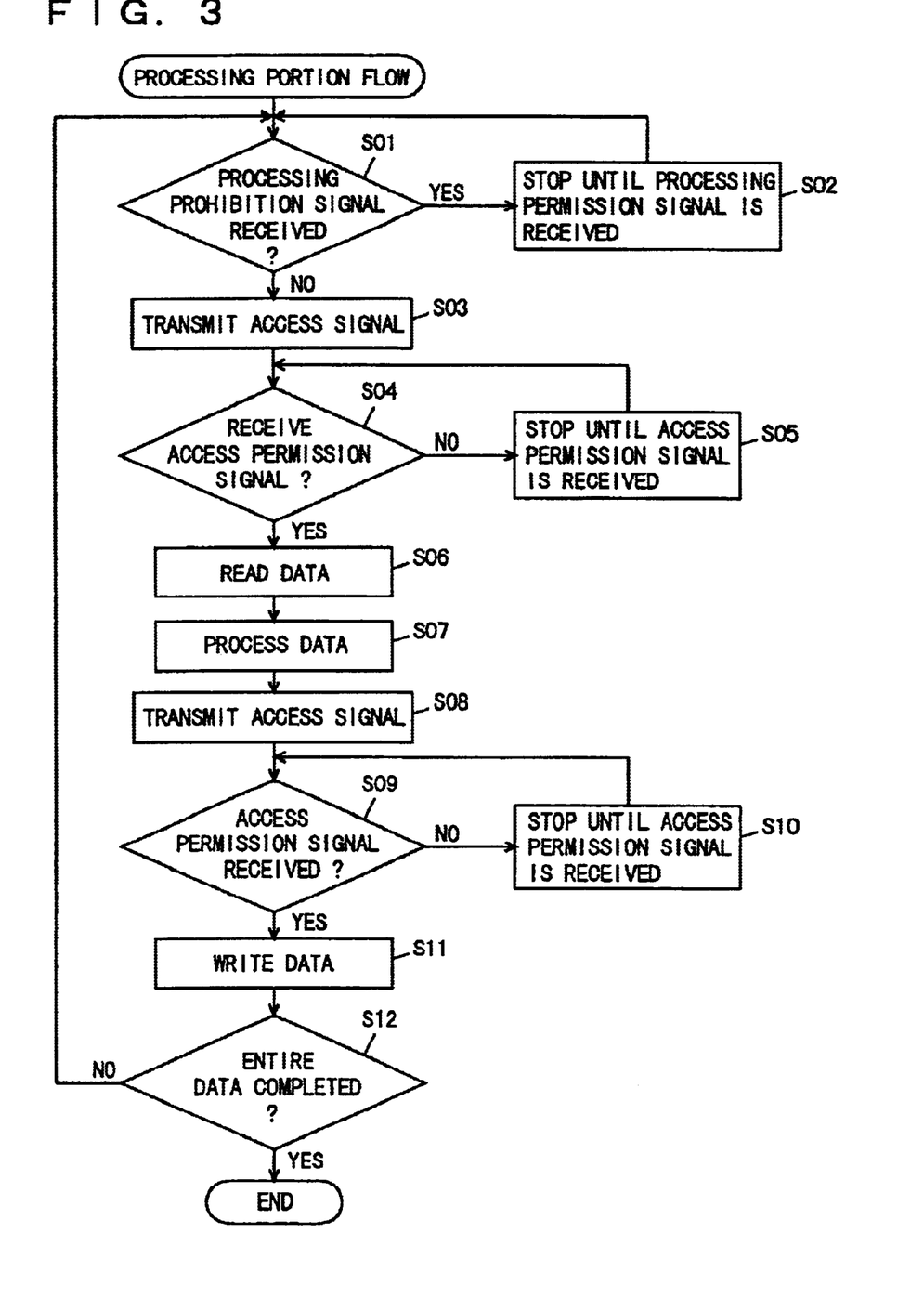
FIG. 3 is a flow chart for use in illustration of the flow of processings executed by processing portions according to this embodiment.

FIG. 3 is a flow chart for use in illustration of the flow of processings executed by processing portions 11 to 14. It is determined at processing portions 11 to 14 whether or not a processing prohibition signal transmitted from state control portion 16 has been received (step S01), and if the processing prohibition signal has been received, execution of a processing is stopped until a processing permission signal output from state control portion 16 is received (step S02). The processing prohibition signal and processing permission signal transmitted from state control portion 16 will be described later.

If the processing prohibition signal has not been received (NO in step S01), in order to request an access to memory 18, an access signal is transmitted to priority control portion 17 (step S03). It is then determined whether or not an access permission signal transmitted from priority control portion 17 has been received (step S04), and a stopped state is continued until the access permission signal is received (step S05). The access permission signal transmitted from priority control portion 17 will be described later.

If the access permission signal has been received (YES in step S04), pixel data is read from memory 18 (step S06) and the read pixel data is subjected to a prescribed processing (step S07). The prescribed processing herein refers to Log conversion for processing portion 11, MTF correction for processing portion 12, gamma correction for processing portion 13, and binarization for processing portion 14.

Then, in order to write the processed data into memory 18, an access signal is transmitted to priority control portion 17 (step S08). It is then determined whether or not an access permission signal has been received from priority control portion 17 (step S09), and a stopped state is continued until the access permission signal is received (step S10).

If the access permission signal has been received from priority control portion 17 (YES in step S09), the processed pixel data is written to memory 18 (step S11).

It is then determined whether or not the entire image data stored in memory 18 has been processed (step S12) and if there is pixel data yet to be processed, the processing from steps S01 to S11 is repeated, while if there is no data to be processed, the processing is completed.

Thus, at processing portions 11 to 14, whether or not to proceed with the processing is controlled in response to the processing prohibition signal or processing permission signal transmitted from state control portion 16, while data writing/reading to/from memory 18 is controlled in response to the access permission signal transmitted from priority control portion 17.

Figure 4:
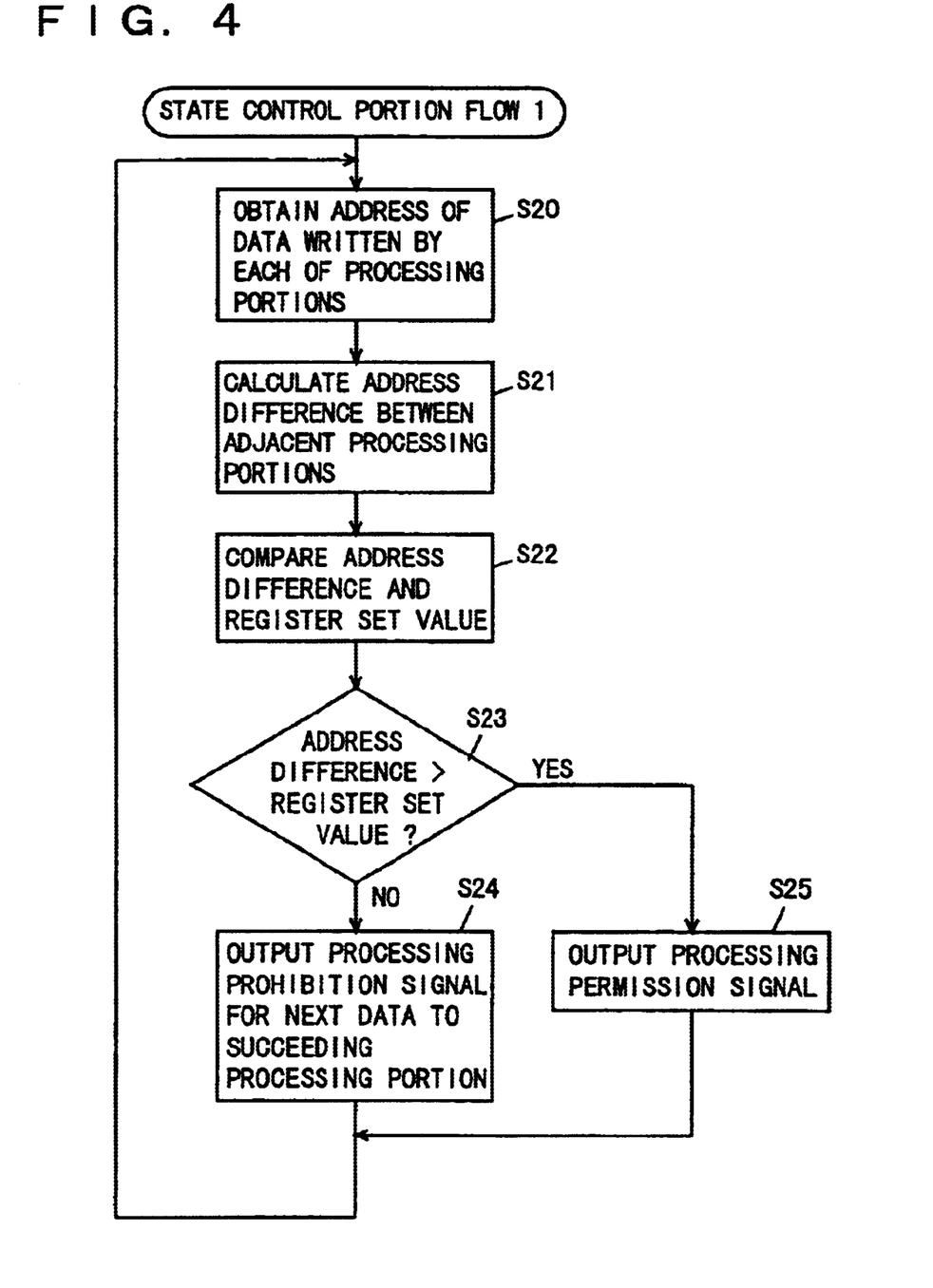
FIG. 4 is a first flow chart for use in illustration of the flow of processing executed by a state control portion according to this embodiment.

FIG. 4 is a flow chart for use in illustration of the flow of processing executed by state control portion 16. Referring to FIG. 4, state control portion 16 constantly obtains through a system bus 20 the address of data to be written to memory 18 by processing portions 11 to 14 (step S20). Image data stored in memory 18 consists of pixel data pieces stored in the order of input by image input device 10, and therefore, in which place in the order the pixel data has been input by image input device 10 can be determined by obtaining the data address in memory 18. As a result, information on up to which pixel data piece each of processings by processing portions 11 to 14 has been executed can be obtained if the address of data at the time when each of processing portions 11 to 14 writes the data to memory 18 is got hold of.

The address difference among adjacent processing portions of processing portions 11 to 14 is calculated based on the data addresses obtained in step S20 (step S21). The address difference between adjacent processing portions for example refers to the address difference between processing portions 11 and 12, the address difference between processing portions 12 and 13 or the address difference between processing portions 13 and 14.

The address difference obtained in step S21 is compared to a register set value pre-stored in memory 18 (step S22), and if the address difference is greater than the register set value, a processing permission signal is output to the succeeding processing portion of the adjacent processing portions (step S25), while if the address difference is equal to or smaller than the register set value, a processing prohibition signal is output to the succeeding processing portion to prohibit processing of the next data (step S24).

The address difference and the register set value will be now described.

Figure 5:
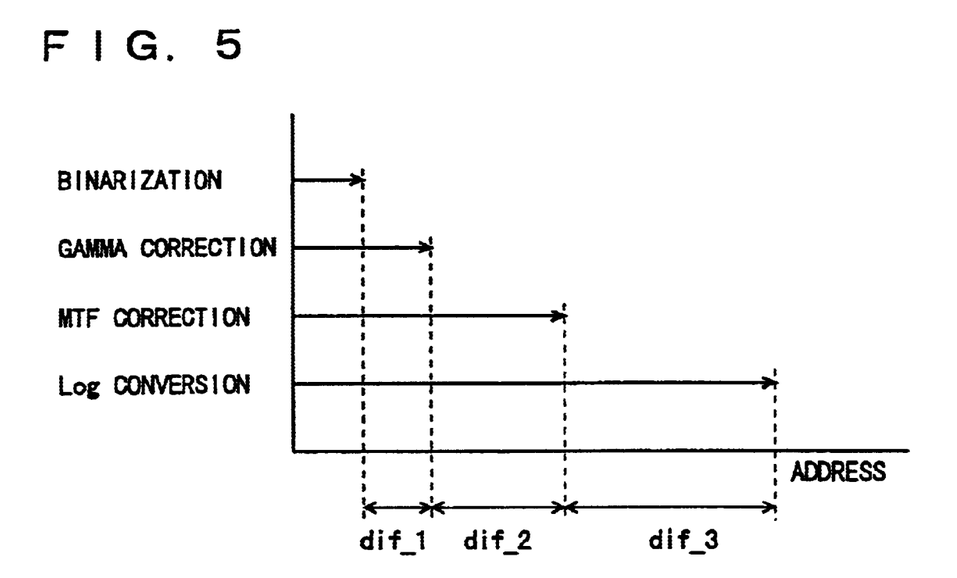
FIG. 5 shows address differences among pixel data pieces processed by the processing portions.

FIG. 5 shows address differences in processing portions 11 to 14. Referring to FIG. 5, the abscissa represents the address, and the arrows represent the addresses of respective data processed by processing portions 11 to 14. The reference character dif_1 represents the address difference between processing portion 14 for binarization and processing portion 13 for gamma correction, dif_2 represents the address difference between processing portion 13 for gamma correction and processing portion 12 for MTF correction, dif_3 represents the address difference between processing portion 12 for MTF correction and processing portion 11 for Log conversion. If the address differences (dif_1, dif_2, dif_3 is small, it shows that the processing speed of the succeeding processing is faster than that of the preceding processing in the state of processing among the adjacent processing portions. In this case, the succeeding processing must be delayed. In order to implement this delay, in this embodiment, state control portion 16 outputs a processing prohibition signal to a processing portion executing the succeeding processing (see step S24 in FIG. 4), so that the processing portion executing the succeeding processing is prohibited from processing data.

Figure 6:
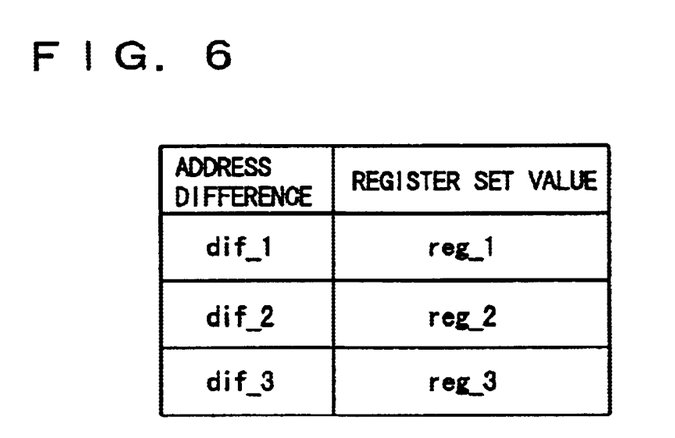
FIG. 6 is a table showing register set values according to this embodiment.

FIG. 6 is a table showing the register set values to be compared to the address differences in step S22 in FIG. 4. Register set values reg_1, reg_2 and reg_3 are previously stored in memory 18. Register set value reg_1 corresponds to address difference dif_1, register set value reg_2 corresponds to address difference dif_2, and register set value reg_3 is set corresponding to address difference dif_3.

Figure 7A:
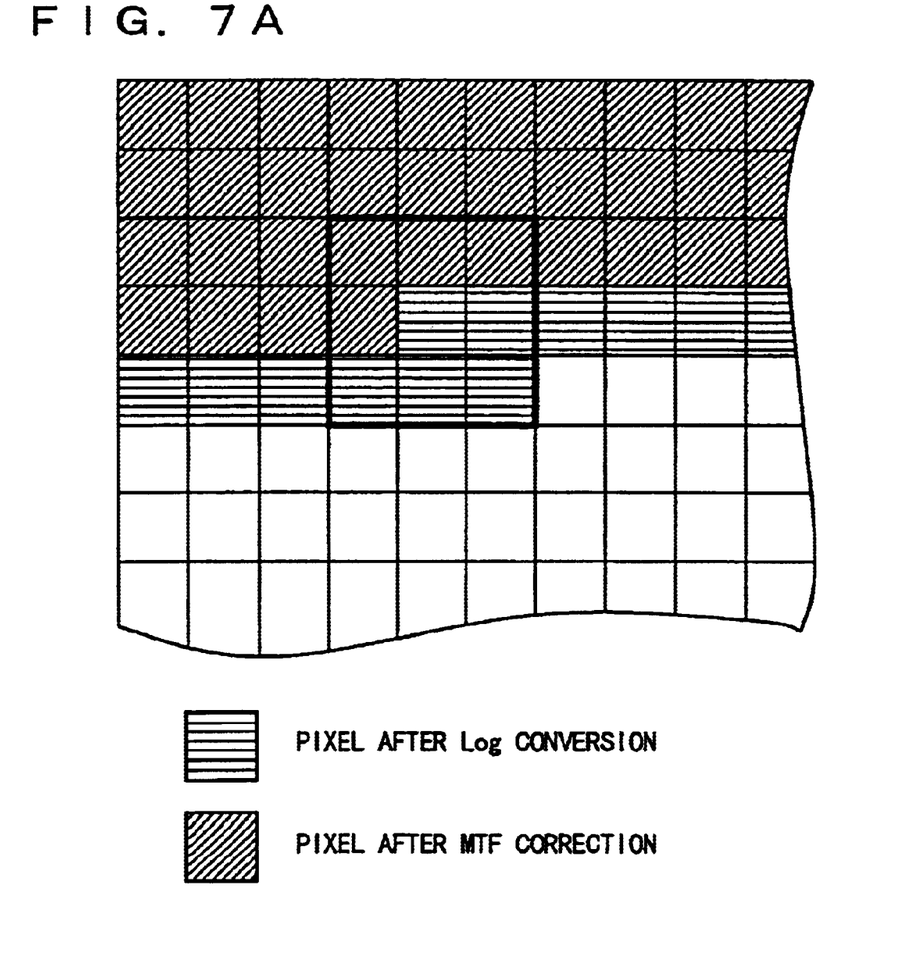
FIGS. 7A and 7B are diagrams for use in illustration of pixel data used for MTF correction processing.
Figure 7B:
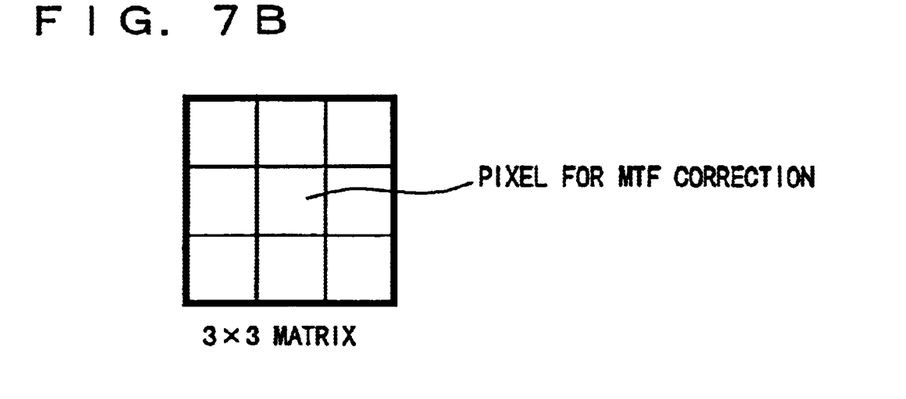

If the address difference between adjacent processing portions is not less than 1, the succeeding processing will not go ahead of the preceding processing. If however a matrix operation of a plurality of pixels such as Laplacian filter processing is performed in MTF correction, a corresponding amount of address difference will be necessary. FIGS. 7A and 7B are diagrams for use in illustration of pixel data used for MTF correction using a 3×3 filter. Referring to FIG. 7A, when MTF correction is executed using the 3×3 filter shown in FIG. 7B, Log conversion must be completed for all the pixels within the 3×3matrix including a pixel to be processed in the center. As a result, the MTF correction requires data for one line each before and after a line including the pixel to be processed, and therefore the address of the pixel subjected to the Log conversion preceding to the MTF correction must be different from the address of the pixel subjected to the MTF correction by the number of pixels for one line +1.

Therefore, the address difference needs only be at least 1, preferably 1 for register set values reg__1 and reg__2, and at least the number of pixels for one line+1, preferably the number of pixels for one line+1 for register set value reg__3.

In step S23 in FIG. 4, the address difference (dif__1, dif__2, dif__3) and the register set value (reg__1, reg__2, reg__3) are compared, and if the address difference is equal to or smaller than the register set value, a processing prohibition signal to prohibit the succeeding processing portion from processing the next data is output to the succeeding processing portion (step S24), while if the address difference is greater than the register set value, a processing permission signal to permit the succeeding processing portion to process the next data is output to the succeeding processing portion (step S25). As a result, state control portion 16 controls processing portions 11 to 14 so that a succeeding processing will not go ahead of a preceding processing.

Figure 8:
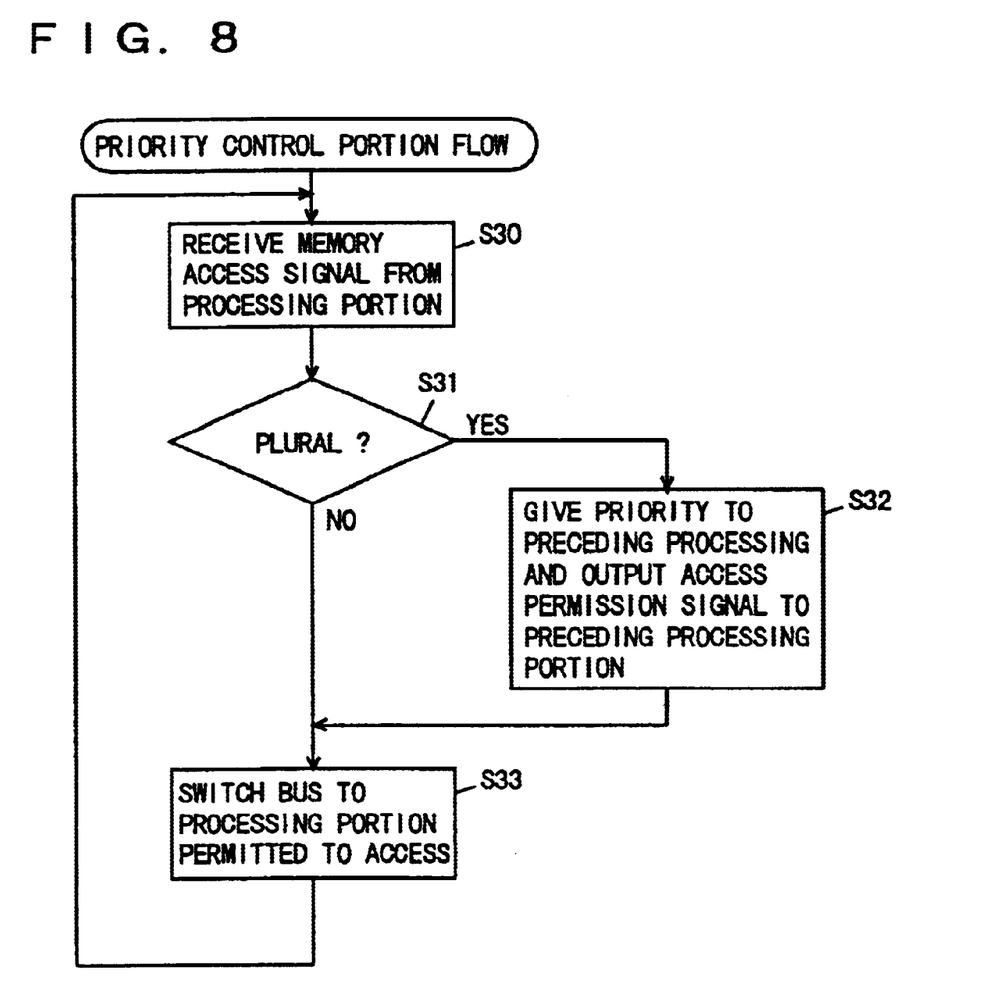
FIG. 8 is a flow chart for use in illustration of the flow of processing executed by a priority control portion according to this embodiment.

FIG. 8 is a flow chart for use in illustration of the flow of processing executed by priority control portion 17. Priority control portion 17 switches system bus 20 to connect processing portions 10 to 15 and memory 18. In the data processing apparatus according to this embodiment, processing portions 10 to 15 can respectively access memory 18 for data reading or writing from time to time. Only one system bus 20 for access to memory 18 is provided, and therefore only one of processing portions 10 to 15 can access memory 18 at a time. Therefore, if a plurality of portions among processing portions 10 to 15 request access to memory 18 at a time, the writing or reading operation by those portions among processing portions 10 to 15 must be arbitrated into one operation. The arbitration is performed by priority control portion 17.

Referring to FIG. 8, priority control portion 17 receives access signals transmitted from processing portions 10 to 15 (step S30). It is determined whether a single or a plurality of access signals have been received (step S31), and if one access signal has been received, system bus 20 is switched to the processing portion which has transmitted the access signal among processing portions 10 to 15 (step S33).

If there are a plurality of access signals received in step S30 (YES in step S31), an access permission signal is output to a processing portion which performs a more preceding processing among the processing portions which have transmitted the access signals among processing portions 10 to 15 (step S32), and system bus 20 is switched to the processing portion to which the access permission signal has been output among processing portions 10 to 15 (step S33).

For example, when access signals are received from two portions, processing portion 11 for Log conversion and processing portion 13 for gamma correction, an access permission signal is output to processing portion 11 which performs the preceding processing, since the Log conversion precedes the gamma correction, and system bus 20 is switched to processing portion 11.

Thus, accessing from processing portions 10 to 15 to memory 18 is controlled by priority control portion 17, and if access requests from a plurality of portions among processing portions 10 to 15 to memory 18 occur, system bus 20 is switched to a processing portion that performs a more preceding processing among processing portions 10 to 15, so that the processing portion which performs a more preceding processing can process data earlier than the others. As a result, if a plurality of pages of image data are input from image input device 10, for example, the next page can be input earlier.

As in the foregoing, in the data processing apparatus according to this embodiment, processing portions 10 to 15 share memory 18, and therefore buffer memories are not necessary between adjacent processing portions of processing portions 10 to 15, for example between processing portions 11 and 12 or between processing portion 14 and image output device 15, so that the necessary memory capacity and the cost of the memory can be reduced.

The progress of processings at processing portions 11 to 14 is got hold of by state control portion 16, and when the difference between the address of data processed by a succeeding processing portion and the address of data processed by a preceding processing portion becomes smaller than a register set value pre-stored in memory 18, a processing prohibition signal is output to the succeeding processing portion to control processing portions 11 to 14 so that execution of the processing by the succeeding processing portion is stopped. As a result, the data processing speed of the entire data processing apparatus can be increased.

Furthermore, if a plurality of processing portions among processing portions 10 to 15 request access to memory 18, priority control portion 17 gives higher priority to and permits a processing portion executing a more preceding processing to access memory 18 among processing portions 10 to 15, so that a processing portion executing a more preceding processing can finish processing earlier, and the next new image data can be input earlier.

State control portion 16 according to this embodiment obtains addresses used by processing portions 11 to 14 for writing data to memory 18, compares the address difference and register set value and gets hold of the progress of processings at processing portions 11 to 14 in order to control processing portions 11 to 14. A writing or reading signal may be received from processing portions 11 to 14 when processing portions 11 to 14 write/read data to/from memory 18, and the number of receiving the reading signal or writing signal is counted, and differences in count values (count difference) may be compared with register set values pre-stored in memory 18 in order to get hold of the progress of processings and control processing portions 11 to 14.

Figure 9:
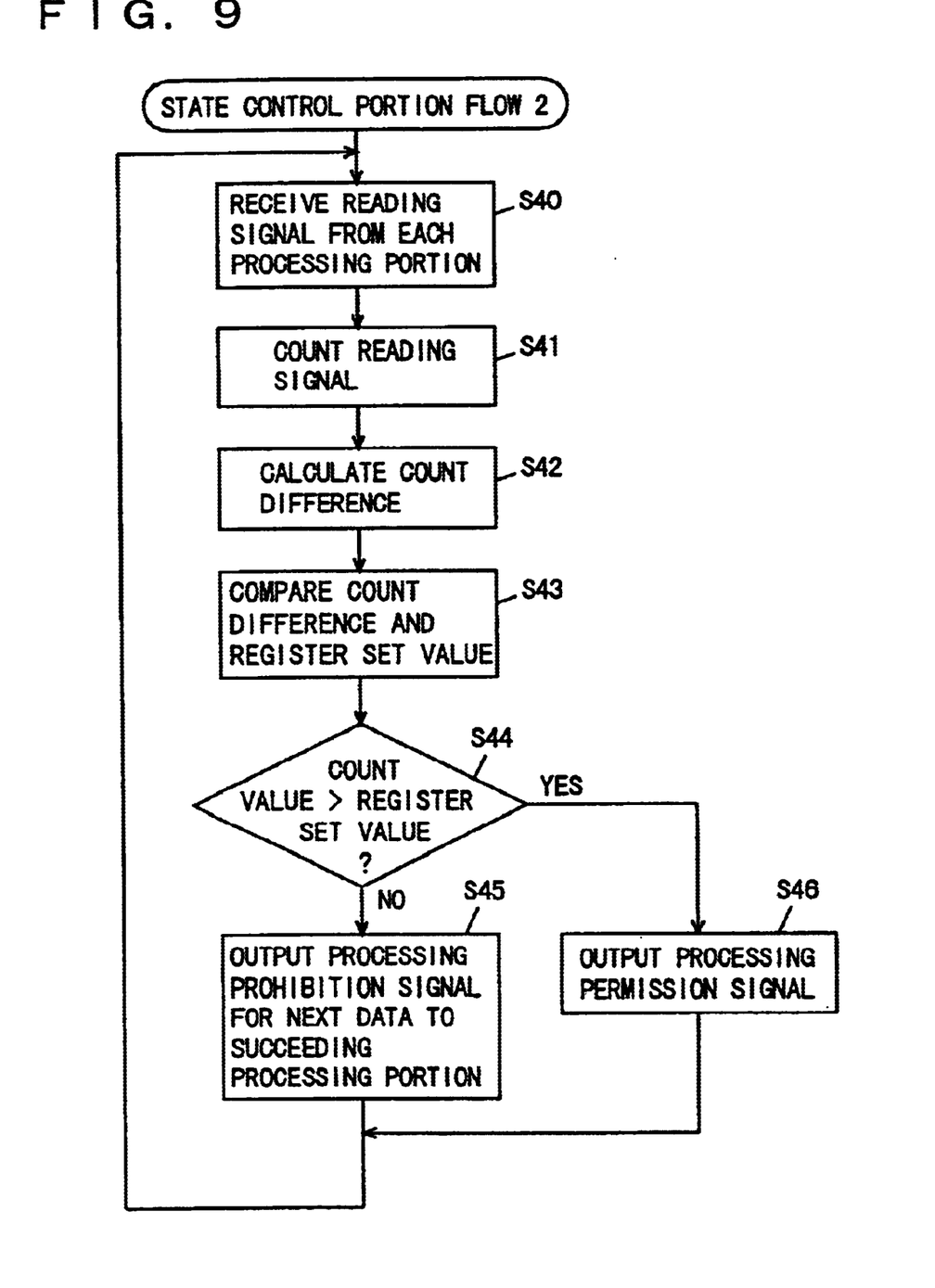
FIG. 9 is a second flow chart for use in illustration of the flow of processing executed by the state control portion according to this embodiment.

The flow of the processing by state control portion 16 in this case is given in a flow chart in FIG. 9. Referring to FIG. 9, state control portion 16 receives a reading signal each transmitted from processing portions 11 to 14 when these portions read data from memory 18 (step S40). The received read signal is counted for each of processing portions 11 to 14 by count unit in state control portion 16 (step S41). Based on the count value counted for each of processing portions 11 to 14, the difference in count values between adjacent processing portions (count difference) is calculated (step S42). For example, the difference between a count value in processing portion 11 for Log conversion and a count value in processing portion 12 for MTF correction is calculated.

The count difference calculated in step S42 and a register set value pre-stored in memory 18 are compared (step S43), and if the count difference is equal to or smaller than the register set value (NO in step S44), a processing prohibition signal is output to a processing portion executing the succeeding processing to prohibit processing of the next data (step S45). For example, if the count difference between adjacent processing portions 11 and 12 is equal to or smaller than the register set value, a processing prohibition signal is output to processing portion 12 (step S45).

If the count difference is greater than the register set value (YES in step S44), a processing permission signal is output to a processing portion executing the succeeding processing (step S46).

Figure 10:
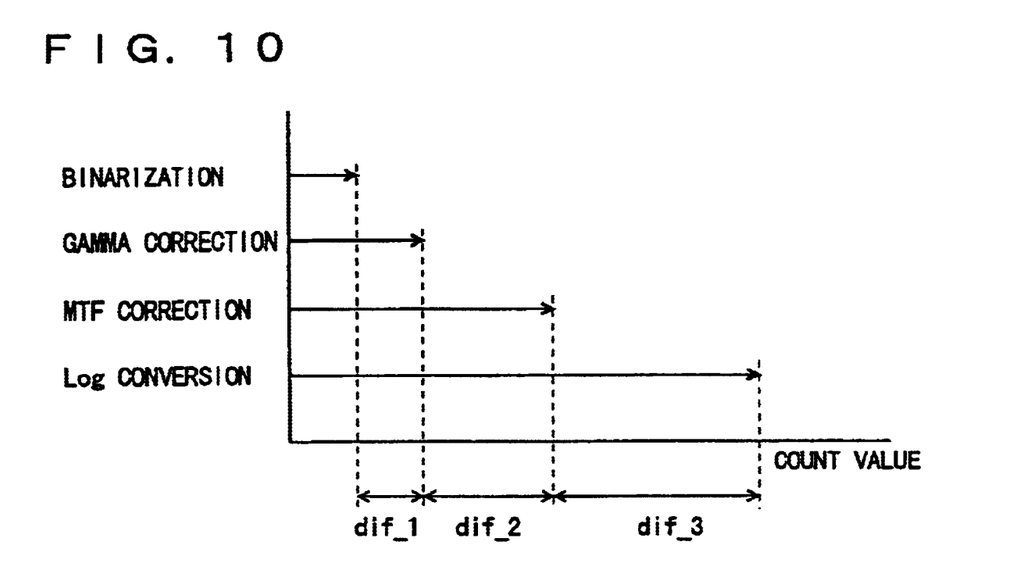
FIG. 10 shows count differences among adjacent processing portions.

FIG. 10 shows the count difference when state control portion 16 performs a processing shown in FIG. 9. Referring to FIG. 10, the abscissa represents the count value, and the arrows each represent a value obtained by counting reading signals transmitted from a processing portion executing a corresponding processing. The reference character dif_1 represents the count difference between processing portion 14 for binarization and processing portion 13 for gamma correction, dif_2 represents the count difference between processing portion 13 for gamma correction and processing portion 12 for MTF correction, and dif_3 represents the count difference between processing portion 12 for MTF correction and processing portion 11 for Log conversion.

State control portion 16 compares a count difference shown in FIG. 10 (dif_1, dif_2, dif_3) and a register set value previously stored in memory 18 (steps S43 and S44 in FIG. 9) to control processing portions 11 to 14 (steps S45 and S46 in FIG. 9).

As described above, state control portion 16 counts reading signals transmitted from processing portions 11 to 14 to get hold of the progress of each of processings by processing portions 11 to 14 and therefore can readily get hold of the progress of each of processings by processing portions 11 to 14 without having to access memory 18. The signal transmitted from each of the processing portions may be a writing signal transmitted at the time of writing.

The image processing apparatus is described in conjunction with this embodiment but the present invention is applicable to a recording medium recorded with a processing program to permit a computer to execute the processing shown in the process flows in FIG. 3, 4 or 9 and in FIG. 8.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system comprising:
   a memory for storing a plurality of pieces of sequentially input data to be processed;
   a plurality of processors for executing a series of processings in a prescribed order to the data to be processed stored in said memory in an order of input; and
   a first controller for determining which processing is stagnant, by monitoring the progress of a processing by each of said plurality of processors, and prohibiting a processor executing a processing succeeding to a processing determined as being stagnant from accessing said memory, wherein
   processings by said plurality of processors are executed asynchronously and
   said plurality of processors share said memory.

2. The data processing system according to claim 1, further comprising a second controller for permitting a processor executing a more preceding processing to access said memory if there are a plurality of access requests to said memory from said plurality of processors at the same time.

3. The data processing system according to claim 2, wherein
   said second controller permits said processor to access said memory by switching a data bus to connect said plurality of processors and said memory.

4. The data processing system according to claim 1, wherein
   said first controller obtains an address in said memory allocated to data processed by each of said plurality of processors to detect the difference between said addresses of two processors adjacent in connection with said prescribed order and determines that a processing by the preceding processor between said two adjacent processors is stagnant if said address difference is greater than a prescribed value.

5. The data processing system according to claim 1, wherein
   said first controller counts the number of pieces of data processed by each of said plurality of processors to detect the difference between the count values of two processors adjacent in connection with said prescribed order and determines that a processing by the preceding processor between the two adjacent processors is stagnant if said count value difference is greater than a prescribed value.

6. The data processing system according to claim 1, wherein
   said data to be processed is image data, and
   said plurality of processors each process said image data on a unit pixel basis.

7. A data processing system, comprising:
   a memory for storing a plurality of pieces of sequentially input data to be processed;
   a plurality of processors for executing a series of processings in a prescribed order to the data to be processed stored in said memory in an order of input; and
   a controller for permitting a processor executing a more preceding processing to access said memory if there are a plurality of access requests to said memory from the plurality of processors at the same time, wherein
   processings by said plurality of processors are executed asynchronously, and
   said plurality of processors share said memory.

8. The data processing system according to claim 7, wherein
   said controller permits said processor to access said memory by switching a data bus to connect said plurality of processors and said memory.

9. The data processing system according to claim 7, wherein
   said data to be processed is image data, and
   said plurality of processors each process said image data on a unit pixel basis.

10. A data processing system, comprising:
    storage means for storing a plurality of pieces of sequentially input data to be processed;
    a plurality of processing means for executing a series of processings in a prescribed order to the data to be processed stored in said storage means in an order of input; and first control means for determining which processing is stagnant by monitoring the progress of a processing by each of said plurality of processing means, and prohibiting processing means executing a processing succeeding to a processing determined as being stagnant from accessing said storage means, wherein processings by said plurality of processing means are executed asynchronously, and said plurality of processing means share said storage means.

11. The data processing system according to claim 10, further comprising second control means for permitting processing means executing a more preceding processing to access said storage means if there are a plurality of access requests to said storage means from said plurality of processing means at the same time.

12. The data processing system according to claim 11, wherein said second control means permits said processing means to access said storage means by switching a data bus to connect said plurality of processing means and said storage means.

13. The data processing system according to claim 10, wherein said first control means obtains an address in said storage means allocated to data processed by each of said plurality of processing means to detect the difference between said addresses of two processing means adjacent in connection with said prescribed order and determines that a processing by the preceding processing means among said two adjacent processing means is stagnant if said address difference is greater than a prescribed value.

14. The data processing system according to claim 10, wherein said first control means counts the number of pieces of data processed by each of said plurality of processing means to detect the difference between the count values of two processing means adjacent in connection with said prescribed order and determines that a processing by the preceding processing means among said two adjacent processing means is stagnant if said count value difference is greater than a prescribed value.

15. The data processing system according to claim 10, wherein said data to be processed is image data, and said plurality of processing means each process said image data on a unit pixel basis.

16. The data processing system of claim 7, wherein said controller always permits a processor executing a more preceding processing to access said memory if there are a plurality of access requests to said memory from the plurality of processors at the same time.

* * * * *